United States Patent Office 3,391,959
Patented July 9, 1968

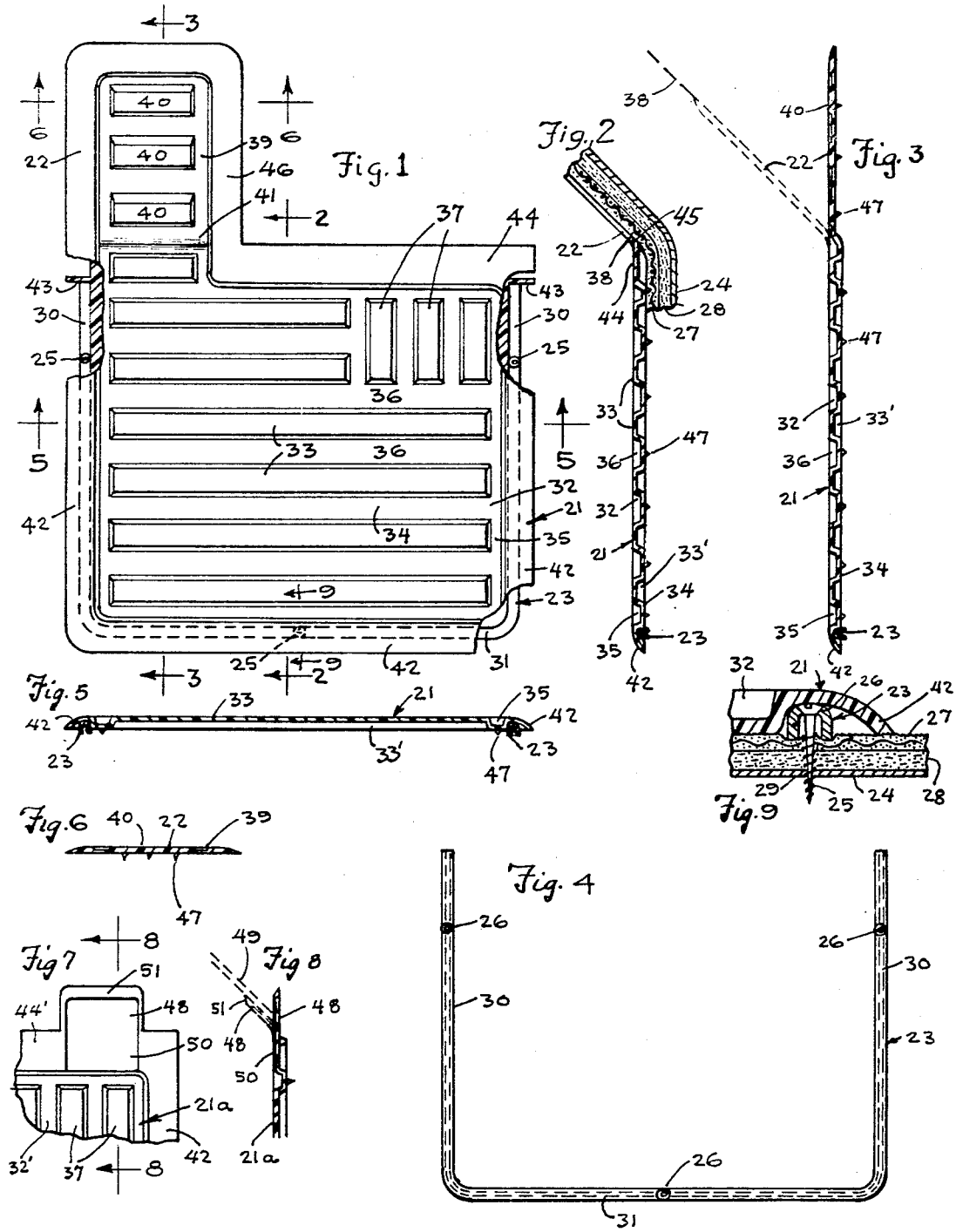

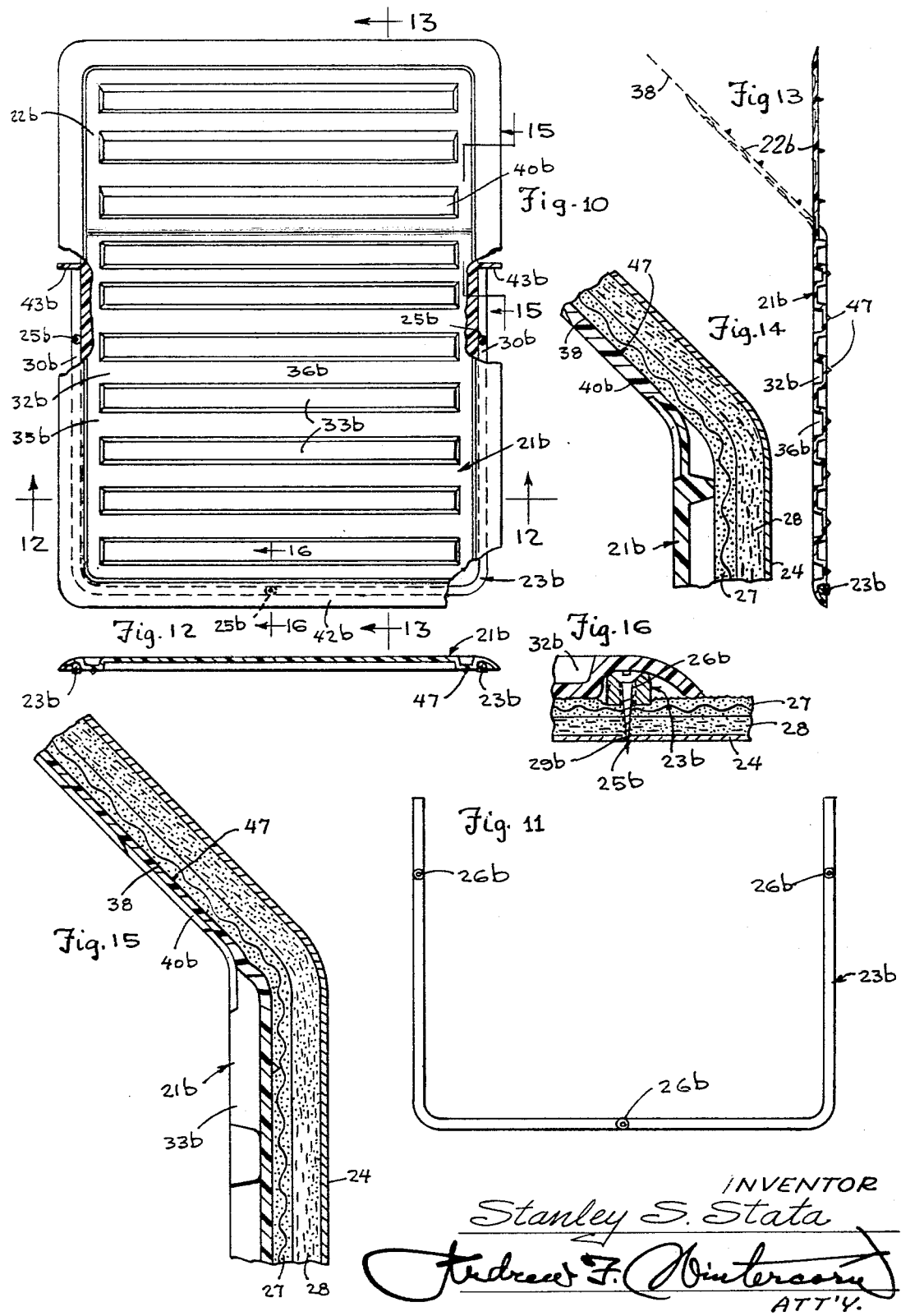

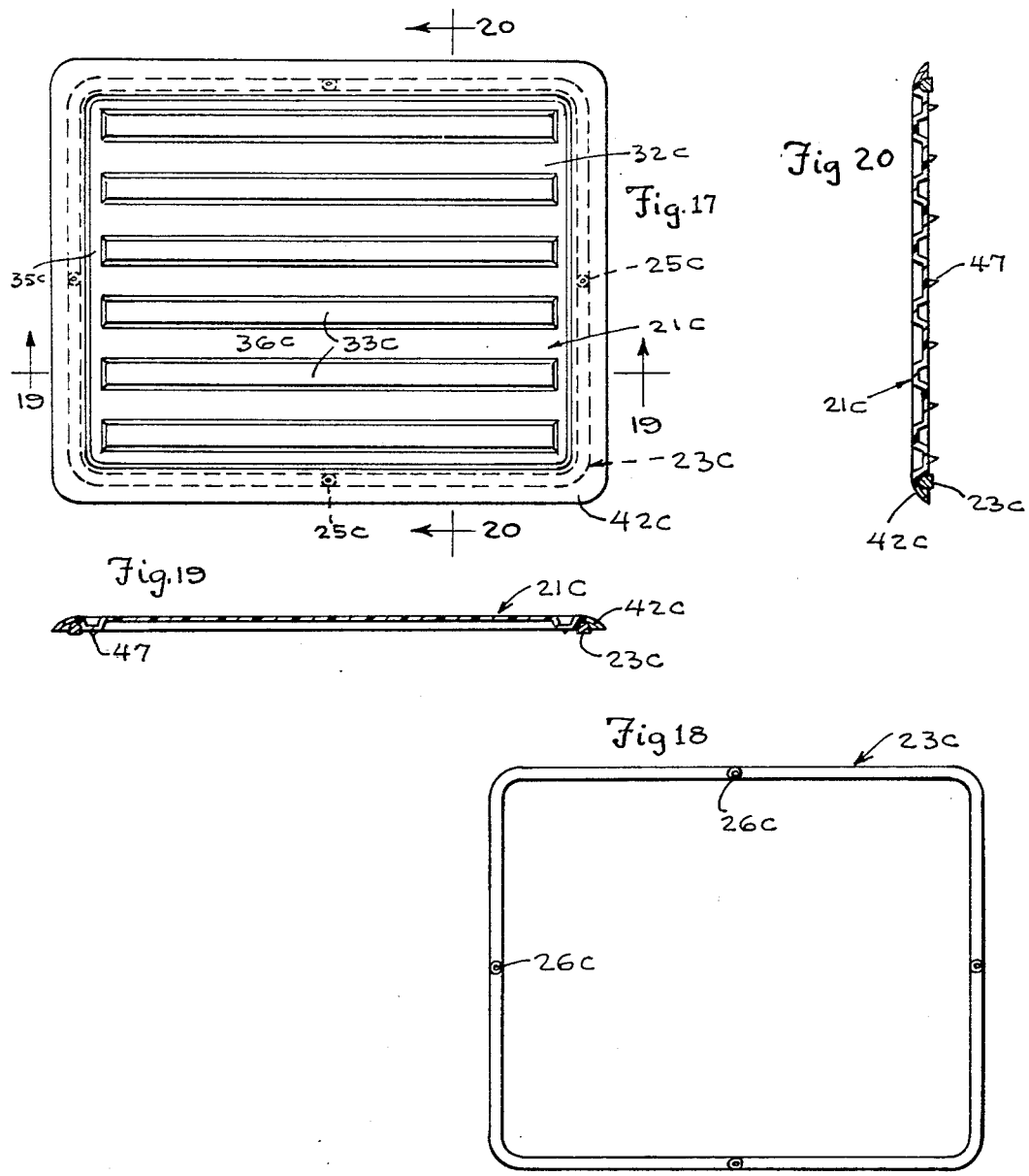

3,391,959
FLOOR MAT AND LOCATING FRAME COM-
BINATION FOR MOTOR VEHICLES
Stanley S. Stata, 301A N. Longwood,
Rockford, Ill. 61107
Filed May 4, 1966, Ser. No. 554,930
15 Claims. (Cl. 296—1)

ABSTRACT OF THE DISCLOSURE

A vehicle floor mat construction for a carpeted vehicle floor having a rigid frame secured to the floor and a mat of flexible material including a pan having a shoe scraper whereby dirt and moisture scraped from shoes is retained in the pan, the mat being removable to facilitate cleaning of the pan and scraper.

This invention relates to a novel floor mat and locating frame combination for application over the carpet on the floors of motor vehicles.

The principal object of my invention is to provide a floor mat of sufficient depth between the shoe scraping ribs thereof to collect moisture and dirt in the anticipated amount, the moisture being retained in the recesses between the ribs during evaporation while leaving the top surfaces of the ribs fairly dry, and the mat being designed to reat on top of the carpet on the floor of the motor vehicle and detachably secured in place by means of a relatively rigid generally rectangular frame rigidly secured to the floor and having the marginal portions of the mat fitting over it for its complete concealment. In the case of the floor mat at the driver's position and the front passenger's position, the mat includes a thinner forwardly and upwardly extending ribbed foot scraping toe-board portion on the front end thereof resting on the carpet of the toe-board and draining freely into the main body portion of the pan, the locating frame in both those cases being devoid of any front cross-portion, the mat having shoulders provided on its marginal portions at both sides for locating abutment with the front ends of the side portions of the frame and, in the case of the floor mat for the driver's position, where the toe-board extension on the mat extends upwardly only on the left hand side of the steering column, the front edge portion of the main body portion of the floor mat to the right of the toe-board extension being beveled off for snug engagement with the carpet on the toe-board in front of the mat, so as to facilitate sweeping dirt off the toe-board carpet into the recesses of the mat. Thus, in all four locations, where these floor mats are used in a motor vehicle, the mats, although securely held in position once inserted in the frames, are easily removable and replaceable, enabling thorough washing and drying the same at intervals for neater appearance.

The invention is illustrated in the accompanying drawings, in which—

FIG. 1 is a plan view of a floor mat and locating frame combination made in accordance with my invention, the mat shown being for the driver's position and having certain portions thereof broken away to show the locating frame into which the marginal portions of the mat fit;

FIG. 2 is a section on the line 2—2 of FIG. 1 showing a portion of the toe-board carpet in section so as to illustrate how the beveled off front edge portion of the mat to the right of the toe-board extension comes flush with the carpet;

FIG. 3 is a section on the line 3—3 of FIG. 1 showing that the front toe-board extension is appreciably thinner than the main body portion of the floor mat and, as indicated in dotted lines, is arranged to be flexed upwardly to overlie the carpet on the toe-board;

FIG. 4 is a plan view of the locating frame by itself;

FIG. 5 is a section on the line 5—5 of FIG. 1;

FIG. 6 is a section of the thinner toe-board extension taken on the line 6—6 of FIG. 1;

FIGS. 7 and 8 are a fragmentary plan view and section, respectively, showing a modified or alternative construction in which there is a short flexible forward tab extension at the accelerator pedal location to overlie the lower hinged end of the pedal for protection thereof against ingress of dirt and moisture, a portion of the pedal being indicated in dotted lines in FIG. 8 under the upwardly flexed position of the extension indicated in dotted lines;

FIG. 9 is a nearly full size section on the line 9—9 of FIG. 1 to better illustrate the interfitting of the marginal portions of the mat in the locating frame and to show how the latter is rigidly secured to the floor using sheet metal screws;

FIG. 10 is a plan view of the floor mat and locating frame therefor provided at the front passenger's position, portions of the mat being broken away to disclose the locating frame under the marginal portions thereof;

FIG. 11 is a plan view of the locating frame by itself;

FIGS. 12 and 13 are sections on the correspondingly numbered lines of FIG. 10;

FIG. 14 is an enlarged sectional detail similar to FIG. 15 but taken on the same line as FIG. 13, FIG. 15 being taken on the line 15—15 of FIG. 10, these two sections showing how the thicker main body portion of the mat rests on the carpet of the floor up to the toe-board, where the toe-board extension, that is thinner, also rests on the carpet of the toe-board;

FIG. 16 is a nearly full size sectional detail similar to FIG. 9 but taken on the line 16—16 of FIG. 10, showing the frame as made of solid material molded to the shape desired, instead of the channel material of FIG. 9;

FIG. 17 is a plan view of one of the two smaller rectangular mats used on the floor in front of the rear seat, indicating the locating frame therefor in dotted lines;

FIG. 18 is a plan view of the locating frame by itself, and

FIGS. 19 and 20 are sections on the correspondingly numbered lines of FIG. 17.

Similar reference numerals are applied to corresponding parts throughout the views.

Referring first to FIGS. 1 to 6, the reference numeral 21 designates a floor mat made in accordance with my invention, designed for use at the driver's position, the same having only a narrow toe-board extension 22 on the left-hand side to be disposed on the toe-board carpet to the left of the steering column, and 23 designates the locating frame therefor, which, as seen in FIG. 9, is molded or die cast of aluminum to a generally U-shaped or channel cross-section and is adapted to be fastened to the floor 24 of the vehicle by means of sheet metal screws 25 entered in holes 26 in the frame and passing through the carpet 27 and sound deadening jute 28 thereunder to thread in holes 29 pierced in the sheet metal floor 24. Three of these screws are indicated, one in each of the side members 30 of the generally U-shaped frame 23 near the front ends and one at the middle of the cross-portion 31 of said frame. Of course, more screws may be used, if needed, but three are doubtlessly sufficient for rigid fastening of the frame. The mat 21, which is molded of rubber or suitable plastic material, comprises a generally rectangular main body portion or pan 32 that is fairly deep and has spaced parallel scraping ribs 33 formed integral with the bottom 34 of the pan, the ribs extending substantially the full depth of the pan and ending short of the sides thereof to leave a deep annular recess 35 all around the pan communicating with ends of the parallel recesses 36 that are provided between the ribs 33, whereby to provide enough space for the collection of the anticipated amount of moisture and dirt, the moisture being thus retained in the pan during evaporation while leaving the top surfaces of the ribs 33 fairly dry. The pan 32 can be easily cleared of dirt at intervals with a vacuum cleaner to keep the mat neat and clean so it really enhances the appearance of the car's interior, besides eliminating the unsightliness that results when the carpeting becomes worn at certain spots. In other words, existing cars with worn spots in the carpeting can have these spots covered up with the present improved floor mat and locating frame combination and their interiors made to look like new. To conserve in the cost of production and also to make the mats lighter weight, the ribs 33 may be made hollow as indicated at 33' in FIGS. 2, 3, and 5. The closely spaced parallel ribs 37 provided in the right-hand front corner portion of the pan serve as a heel rest behind the accelerator pedal disposed in front of the pan, these ribs allowing easy drainage of moisture from between them into the adjacent recesses 35 and 36.

The toe-board extension 22 molded integral with the pan 32 is generally rectangular in form and fairly narrow and extends from the left front corner of the pan and is adapted to rest on the carpet on the toe-board as indicated in dotted lines at 38 in FIG. 3 and in full lines at 38 in FIG. 2. The toe-board extension as clearly illustrated in FIG. 3, is thinner than the pan 32 and normally in coplanar relationship to the top of the pan but arranged to be flexed upwardly at an angle of approximately 45° to rest on the carpet on the toe-board 38. The toe-board extension 22 has a shallow generally rectangular recess 39 provided therein from which project a plurality of foot scraping ribs 40 of small height in widely spaced relation off which there is good drainage at 39 into the pan 32 as indicated at 41. Thus, there is no occasion for any moisture scraped off the shoes on the mat getting onto the carpet 27, whether it be in using the ribs 40 of small height or the ribs 33 of greater height. All of the moisture is retained in the pan 32 until evaporated, and, of course, all of the dirt is also retained therein, but the top surfaces of the ribs 33 and 40 remain fairly dry.

The mat 21 has downwardly curved flanges 42 molded integral therewith on those three sides of the pan or body portion 32 that fit snugly in the locating frame 23, the flanges serving to cover up and completely conceal said frame, as best seen in FIGS. 1 and 9. Shoulders 43 defined on opposite sides of the mat under the front ends of the flanges 42 have locating abutment with the front ends of the two arms 30 of the frame 23, whereby to fix the location of the mat 21 properly with respect to the toe-board 38, so that the front horizontal top wall 44 will have its bevelled front edge 45 flush with the toe-board carpet and permit easily sweeping dirt off the toe-board carpet into the pan 32. The wall 44 just mentioned is in coplanar relationship to the marginal portion 46 of the toe-board extension 22 when the mat lies flat, as in FIG. 1 but the extension 22 is flexed upwardly as shown in dotted lines in FIG. 3 and overlies the carpet on the toe-board, as indicated at 38 in FIGS. 2 and 3. It should be clear, therefore, that so long as the mat 21 is in place in the locating frame 23, any dirt on the carpet around the mat can be swept into the pan over the curved flanges 42 on the three sides of the pan and over the flat front top wall 44. Then, assuming vacuum cleaning of the mat is not sufficient, because, for example, of unsightly smears of dirt that might not be otherwise so easily removed, the mat can be removed readily enough from the frame 23 for thoroughly washing and drying the same, and then replaced in the frame in precisely the same position as before.

In passing, attention is called to the downwardly projecting sharply pointed spurs 47 molded integral with the bottom of the mat 21 and its extension 22. These serve by impression in the carpet 27 when the mat is placed inside the frame 23 to take hold of the carpet and prevent displacement of the mat in any direction from its set position in the frame 23 even when heavy foot pressure is applied in scraping off dirt from the bottom of a shoe.

Referring to FIGS. 7 and 8, in which a right front corner portion of a mat 21a is shown, of similar construction to the mat 21 of FIGS. 1 to 6 in all other respects, a forwardly projecting generally rectangular flexible tab 48 is provided molded integral with the front top wall 44' of the mat at the location of the accelerator pedal indicated in dotted lines at 49 in FIG. 8, to be flexed upwardly and overlie the hinged rear portion of the pedal 49 and protect it against ingress of dirt and moisture, a shallow rectangular recess 50 being provided in this corner portion of the mat draining from the tab 48 into the front end of the pan 32 so that any moisture coming off the driver's shoe while he is resting his foot against the accelerator pedal will have an opportunity to drain nicely into the pan 32' and not run off the mat in the vicinity of the accelerator pedal. The front end of the tab 48 is bevelled off, as indicated at 51, so that any moisture getting on the pedal 49 will have an opportunity to drain into the recess 50 and thence into the pan.

The mat 21b shown in FIG. 10 is for the front passenger's position and is similar to the mat 21 shown in FIG. 1, except that all of the ribs 33b extend the full width of the pan 32b and there are no transversely extending ribs 37, as in FIG. 1, there being no accelerator pedal at this position. The toe-board extension 22b on this mat extends the full width of the pan portion 32b, and all of the shoe scraper ribs 40b on the toe-board 22b are of the same length as the shoe scraper ribs 33b. The bottom of the pan portion 33b has the same channels 36b between the ribs 33b and the same marginal channels 35b at the ends of these ribs on both sides of the pan, and, of course, the toe-board extension 22b, which is disposed in the same plane with the top of the pan 32b until it is flexed upwardly, as indicated in dotted lines at 38 in FIG. 13 and in full lines at 38 in FIGS. 14 and 15 to overlie the carpet on the toe-board, drains into the pan portion 32b similarly as in the floor mat 21 previously described. Also, there are the same shoulders 43b provided on opposite sides of the pan portion under the outwardly and downwardly curved flanges 42b for locating abutment with the front ends of the arms 30b of the generally U-shaped locating frame 23b. The latter has close contact along three sides of the pan portion 32b, similarly as in the case of mat 21, but this frame 23b, as best appears in FIG. 16, is made of solid material with holes 26b molded therein for reception of the screws 20b that fasten the frame securely in place by piercing and threading in holes 29b in the floor 24, the screws extending through the carpet 27 and sound deadening jute 28 therebeneath, as shown. Here again, three screws 25b are indicated, although more may be used if that is considered necessary. This combination is otherwise the same as that disclosed in FIGS. 1 through 6 and, of course, the operation is substantially the same.

Referring next to FIGS. 17 to 20, the floor mat 21c is designed for use in each of the two rear seat locations and has a complete four-sided rectangular locating frame 23c fitting snugly against all four sides of the pan portion 32c and concealed completely by the marginal outwardly and downwardly curved flanges 42c provided on all four sides of the mat. The ribs 33c for shoe scraping purposes extend substantially the full width of the pan 32c and have channels 36c therebetween communicating with marginal channels 35c at their opposite ends. The frame 23c has holes 26c in the middle of the four sides thereof to receive screws 25c for fastening the frame securely to the floor 24 with the screws extending through the carpet 27 and jute layer 28 therebeneath, similarly as shown in FIG. 16. Except for the elimination of a toe-board extension, this combination operates the same as that of FIGS. 10 to 16, and the frame 23c, which may be like that shown in FIG. 9 or that shown in FIG. 16, but is indicated in FIGS. 19 and 20, as of the latter type, operates the same as frames 23 and 23b in holding the floor mat securely in a given position.

It is believed the foregoing description conveys a good understanding of the objects and advantages of my invention. The appended claims have been drawn to cover all legitimate modifications and adaptations.

I claim:

1. In a floor mat construction for vehicles, a substantially horizontal floor overlaid with carpet of compressable material, a generally rectangular frame of relatively rigid material resting on the carpet and rigidly secured to the floor through said carpet so as to be impressed therein and thereby held against lateral displacement, a floor mat of flexible material which includes a generally rectangular pan resting on the carpet inside and closely confined by said frame so as to fix the location of said mat on said floor, and shoe scraper means provided in said pan, whereby dirt and moisture scraped from the bottom of shoes is retained in said pan for evaporation of the moisture while the top of said scraper means remains fairly dry, said mat being removable from and replaceable in said frame to facilitate thorough cleaning of said pan and scraper means, one of said frame and mat having a downwardly sloping outer side reaching from the carpet up to the elevation of the top of said mat over which dirt may be swept from the carpet over said frame into said pan.

2. A floor mat construction as set forth in claim 1 wherein the shoe scraper means provided in said pan is in the form of integral ribs in spaced relation to one another and to the sides of said pan, whereby moisture collected in said pan is substantially uniformly distributed to facilitate evaporation thereof.

3. A floor mat construction as set forth in claim 1 wherein said frame is of low height in relation to the pan portion of said mat, said mat including a marginal outer rim portion overlying said frame and having downwardly extending outer edge portions engaging the carpet outside said frame whereby said frame is completely concealed.

4. A floor mat construction as set forth in claim 1 wherein said frame is of low height in relation to the pan portion of said mat, said mat including a marginal rim portion overlying said frame and having downwardly extending outer edge portions engaging the carpet outside said frame whereby said frame is completely concealed, the edge portions contacting the carpet being tapered to lie flush with the carpet and thus facilitate sweeping dirt from the carpet over the rim portion of said mat into said pan.

5. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame.

6. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, the mat including a generally rectangular relatively thin flexible toe-board extension on the front end thereof that is normally in coplanar relationship to the top of the rest of the mat but is flexible upwardly to overlie the carpet on the toe-board.

7. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, the mat including a generally rectangular relatively thin flexible toe-board extension on the front end thereof that is normally in coplanar relationship to the top of the rest of the mat but is flexible upwardly to overlie the carpet on the toe-board, the toe-board extension having a shallow generally rectangular recess provided therein communicating at the rear thereof with the pan so as to drain into said pan.

8. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, the mat including a generally rectangular relatively thin flexible toe-board extension on the front end thereof that is normally in coplanar relationship to the top of the rest of the mat but is flexible upwardly to overlie the carpet on the toe-board, the toe-board extension having a shallow generally rectangular recess provided therein communicating at the rear thereof with the pan so as to drain into said pan, and shoe scraper ribs integral with said toe-board extension in spaced relation to one another and to the sides of said recess whereby moisture scraped off shoes on said ribs can drain from said recess into said pan.

9. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, the mat including a generally rectangular relatively thin flexible toe-board extension on the front end thereof that is normally in coplanar relationship to the top of the rest of the mat but is flexible upwardly to overlie the carpet on the toe-board, the toe-board extension having a shallow generally rectangular recess provided therein communicating at the rear thereof with the pan so as to drain into said pan, and shoe scraper ribs integral with said toe-board extension in spaced relation to one another and to the sides of said recess whereby moisture scraped off shoes on said ribs can drain from said recess into said pan, the toe-board extension being narrow in relation to the rest of said mat and extending forwardly from the left side thereof, and the front of said mat having a horizontal top wall to the right of said toe-board extension extending forwardly from said pan for abutment with the carpet on the toe-board.

10. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, the mat including a generally rectangular relatively thin flexible toe-board extension on the front end thereof that is normally in coplanar relationship to the top of the rest of the mat but is flexible upwardly to overlie the carpet on the toe-board, the toe-board extension having a shallow generally rectangular recess provided therein communicating at the rear thereof with the pan so as to drain into said pan, and shoe scraper ribs integral with said toe-board extension in spaced relation to one another and to the sides of said recess whereby moisture scraped off shoes on said ribs can drain from said recess into said pan, the toe-board extension being narrow in relation to the rest of said mat and extending forwardly from the left side thereof, and the front of said mat having a horizontal top wall to the right of said toe-board extension extending forwardly from said pan for abutment with the carpet on the toe-board, the forward edge of said wall being tapered to conform to the angle of the toe-board and being disposed in close contact with the carpet so as to permit easily sweeping dirt off the toe-board carpet over said wall and into said pan.

11. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, the mat including a generally rectangular relatively thin flexible toe-board extension on the front end thereof that is normally in coplanar relationship to the top of the rest of the mat but is flexible upwardly to overlie the carpet on the toe-board, the toe-board extension having a shallow generally rectangular recess provided therein communicating at the rear thereof with the pan so as to drain into said pan, and shoe scraper ribs integral with said toe-board extension in spaced relation to one another and to the sides of said recess whereby moisture scraped off shoes on said ribs can drain from said recess into said pan, the toe-board extension being narrow in relation to the rest of said mat and extending forwardly from the left side thereof, and the front of said mat having a horizontal top wall to the right of said toe-board extension extending forwardly from said pan for abutment with the carpet on the toe-board, said wall including a generally rectangular forwardly extending tab that is flexible upwardly with respect to said wall and is adapted to overlie a rear portion of an accelerator pedal extending upwardly relative to the front end of said mat.

12. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, the mat including a generally rectangular relatively thin flexible toe-board extension on the front end thereof that is normally in coplanar relationship to the top of the rest of the mat but is flexible upwardly to overlie the carpet on the toe-board, the toe-board extension having a shallow generally rectangular recess provided therein communicating at the rear thereof with the pan so as to drain into said pan, and shoe scraper ribs integral with said toe-board extension in spaced relation to one another and to the sides of said recess whereby moisture scraped off shoes on said ribs can drain from said recess into said pan, the toe-board extension being narrow in relation to the rest of said mat and extending forwardly from the left side thereof, and the front of said mat having a horizontal top wall to the right of said toe-board extension extending forwardly from said pan for abutment with the carpet on the toe-board, said wall including a generally rectangular forwardly extending tab that is flexible upwardly with respect to said wall and is adapted to overlie a rear portion of an accelerator pedal extending upwardly relative to the front end of said mat, said wall and tab extension having a shallow recess provided therein for drainage of moisture therefrom into said pan.

13. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, the mat including a generally rectangular relatively thin flexible toe-board extension on the front end thereof that is normally in coplanar relationship to the top of the rest of the mat but is flexible upwardly to overlie the carpet on the toe-board, the toe-board extension having a shallow generally rectangular recess provided therein communicating at the rear thereof with the pan so as to drain into said pan, and shoe scraper ribs integral with said toe-board extension in spaced relation to one another and to the sides of said recess whereby moisture scraped off shoes on said ribs can drain from said recess into said pain, the toe-board extension being narrow in relation to the rest of said mat and extending forwardly from the left side thereof, and the front of said mat having a horizontal top wall to the right of said toe-board extension extending forwardly from said pan for abutment with the carpet on the toe-board, said wall including a generally rectangular forwardly extending tab that is flexible upwardly with respect to said wall and is adapted to overlie a rear portion of an accelerator pedal extending upwardly relative to the front end of said mat, said tab extension having a tapered forward edge to promote drainage off the accelerator pedal over the tab and into the recess and thence into the pan.

14. A floor mat construction as set forth in claim 1 including small projections on the bottom of said pan arranged to be impressed in the carpet to resist horizontal displacement of the mat from a set position in said frame.

15. A floor mat construction as set forth in claim 1 wherein said frame is generally U-shaped with the arms of the U substantially parallel and projecting forwardly from the cross-portion, the mat having shoulders defined on opposite sides of the pan portion thereof for locating abutment with the front ends of the arms of said U-shaped frame while said pan is closely confined on three sides by said frame, said mat including small projections on the bottom of said pan arranged to be impressed in the carpet to resist forward displacement of the mat relative to the frame.

References Cited

UNITED STATES PATENTS

| | | | |
|---|---|---|---|
| 3,087,752 | 4/1963 | Winchester | 296—1 |
| 3,129,972 | 4/1964 | Vodra | 296—1 |
| 3,149,875 | 9/1964 | Stata | 296—1 |

PHILIP GOODMAN, *Primary Examiner.*